US009293055B2

(12) United States Patent
Nutaro et al.

(10) Patent No.: US 9,293,055 B2
(45) Date of Patent: Mar. 22, 2016

(54) SMART ELECTRIC TAXI PATH CONTROL

(71) Applicant: HONEYWELL INTERNATIONAL INC., Morristown, NJ (US)

(72) Inventors: Joseph Nutaro, Phoenix, AZ (US); Patrick Jackson, Peoria, AZ (US); Jay Sims, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/325,565

(22) Filed: Jul. 8, 2014

(65) Prior Publication Data
US 2016/0012736 A1    Jan. 14, 2016

(51) Int. Cl.
| G01C 23/00 | (2006.01) |
| G08G 5/06 | (2006.01) |
| B64C 25/34 | (2006.01) |
| B64C 25/40 | (2006.01) |
| B64C 25/42 | (2006.01) |
| G05D 1/00 | (2006.01) |
| G05D 13/62 | (2006.01) |

(52) U.S. Cl.
CPC ............ *G08G 5/065* (2013.01); *B64C 25/34* (2013.01); *B64C 25/405* (2013.01); *B64C 25/42* (2013.01); *G05D 1/0083* (2013.01); *G05D 13/62* (2013.01)

(58) Field of Classification Search
CPC ..... G08G 5/065; B64C 25/405; Y02T 50/823
See application file for complete search history.

(56) References Cited

U.S. PATENT DOCUMENTS

| 3,807,664 | A | 4/1974 | Kelly et al. |
| 7,340,327 | B2 | 3/2008 | Villaume et al. |
| 7,445,178 | B2 | 11/2008 | McCoskey et al. |
| 7,975,960 | B2 | 7/2011 | Cox et al. |
| 8,403,259 | B2 | 3/2013 | Charuel et al. |
| 8,517,303 | B2 | 8/2013 | Dilmaghni et al. |
| 8,620,493 | B2 | 12/2013 | Hughes et al. |
| 8,676,399 | B2 | 3/2014 | Nutaro et al. |
| 2007/0282491 | A1 | 12/2007 | Cox et al. |
| 2008/0275642 | A1* | 11/2008 | Clark ............ G08G 5/0021 701/457 |
| 2011/0290933 | A1* | 12/2011 | Cros ............ B64C 25/405 244/50 |
| 2012/0168557 | A1 | 7/2012 | Edelsom et al. |
| 2013/0200209 | A1 | 8/2013 | Goldman et al. |
| 2014/0114557 | A1 | 4/2014 | Nutaro et al. |

\* cited by examiner

*Primary Examiner* — Michael D Lang
(74) *Attorney, Agent, or Firm* — Shimokaji IP

(57) ABSTRACT

An aircraft taxi control system may include a motor connected to drive a landing gear wheel of the aircraft. A motor controller may be connected to control speed of the motor. The system may also include an aircraft taxi route database, an aircraft position determination unit; an aircraft performance database and a processor configured to a) integrate signals from the aircraft taxi route database, the aircraft position determination unit and aircraft performance database, and b) produce a motor deceleration signal to the motor controller when the aircraft arrives at a predetermined distance from a predetermined location so that the aircraft arrives at the location traveling at a desired speed.

19 Claims, 5 Drawing Sheets

SMART ELECTRIC TAXI PATH CONTROL

BACKGROUND OF THE INVENTION

The present invention generally controlling taxi speeds of an aircraft during ground-based operations. More particularly, the invention relates to automated taxi speed control and guidance systems that may be readily retrofitted into existing aircraft.

Traditional aircraft taxi systems utilize the primary thrust engines (running at idle) and the braking system of the aircraft to regulate the speed of the aircraft during taxi. Such use of the primary thrust engines, however, is inefficient and wastes fuel. For this reason, electric taxi systems (i.e., traction drive systems that employ electric motors) have been developed for use with aircraft. Electric taxi systems are more efficient than traditional engine-based taxi systems because they can be powered by an auxiliary power unit (APU) of the aircraft rather than the primary thrust engines.

In its simplest form, a crew member may manually steer the aircraft during an electric taxi maneuver using a flight deck controller (e.g. a tiller) while looking out a window. In this case, the crew member utilizes his or her best judgment regarding execution of a taxi maneuver. An improvement over this process is provided by a visual guidance system wherein a crew member enters airport parameters such as airport congestion, the visual guidance system determines the best taxi path, subject to airport terminal control (ATC) clearance, and presents it on a cockpit display along with instructions as to the best way to navigate the aircraft along the suggested taxi path; e.g. speed, steering, when to turn thrust engines off and turn electric drive motors on, etc. ATC clearance can include taxi route, assigned take-off or landing runway, hold points etc. and is considered in the calculated path.

While effective, the above described visual guidance system exhibits certain inefficiencies. For example, variations in complying with display guidance instructions, even in the neighborhood of a few seconds, may decrease fuel savings; e.g. a pilot waits a short time before turning thrust engines off. The pilot may execute faster turns than necessary resulting in increased tire wear, or brake more often than necessary causing unnecessary wear and tear on the braking system. In addition, some actions that would increase efficiency are too subtle for the crew to recognize and manage; e.g. optimum acceleration of the aircraft during taxi.

Some automated taxi control systems have been proposed and described in the prior art. Typically such prior art systems include features for control of steering and braking of an aircraft during ground operations. While implementation of such systems may be practical when constructing a newly designed aircraft, they have limited applicability for existing aircraft. If such a prior art system were to be retrofitted into an existing aircraft, there would be a need to re-design and modify all of the braking and steering systems of the aircraft. Such a retrofitting would be very costly.

As can be seen, there is a need for an automated taxi speed control and guidance system that may be readily retrofitted into existing aircraft. More particularly, there is a need for such a system that may perform automatic speed control while leaving a pilot to steer the aircraft while at the same time providing display guidance.

SUMMARY OF THE INVENTION

In one aspect of the present invention, an aircraft taxi control system may comprise: at least one motor connected to drive at least one landing gear wheel of the aircraft; a motor controller connected to control speed of the at least one motor; an aircraft taxi route database; an aircraft position determination unit; an aircraft performance database; a processor configured to a) integrate signals from the aircraft taxi route database, the aircraft position determination unit and aircraft performance database, and b) produce a motor deceleration signal to the motor controller when the aircraft arrives at a predetermined distance from a predetermined location so that the aircraft arrives at the location traveling at a desired speed.

In another aspect of the present invention, apparatus for retrofitting an automated taxi control system onto an aircraft with a pre-existing friction brake system, the apparatus may comprise: at least one motor connected to drive at least one landing gear wheel of the aircraft; a motor controller connected to control speed of the at least one motor and the aircraft without employment of a pre-existing friction braking system; an aircraft taxi route database; an aircraft position determination unit; an aircraft performance database; a processor configured to, a) integrate signals from the aircraft taxi route database, the aircraft position determination unit and aircraft performance database, and b) produce a motor deceleration signal to the motor controller when the aircraft arrives at a predetermined distance from a predetermined location so that the aircraft arrives at the location traveling at a desired speed without use of the pre-existing friction brake system.

In still another aspect of the present invention, a method for guiding an aircraft during ground based operation may comprise the steps: propelling the aircraft with at least one motor connected to drive at least one landing gear wheel of the aircraft; controlling speed of the motor with a motor controller; providing information to a processor from; a) an aircraft taxi route database, b) an aircraft position determination unit. and c) an aircraft performance database; integrating signals in the processor from the aircraft taxi route database, the aircraft position determination unit and aircraft performance database, and producing a motor deceleration signal from the processor to the motor controller when the aircraft arrives at a predetermined distance from a turning location so that the aircraft arrives at the turning location traveling at a desired turning speed.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides an automated taxi control system that may be readily retrofitted into existing aircraft. The system may provide display guidance to a pilot and perform automatic speed control while leaving a pilot to manually steer the aircraft. More particularly, the system may relieve the pilot from a need to continuously perform manual speed adjusting of the aircraft.

Figure 1:
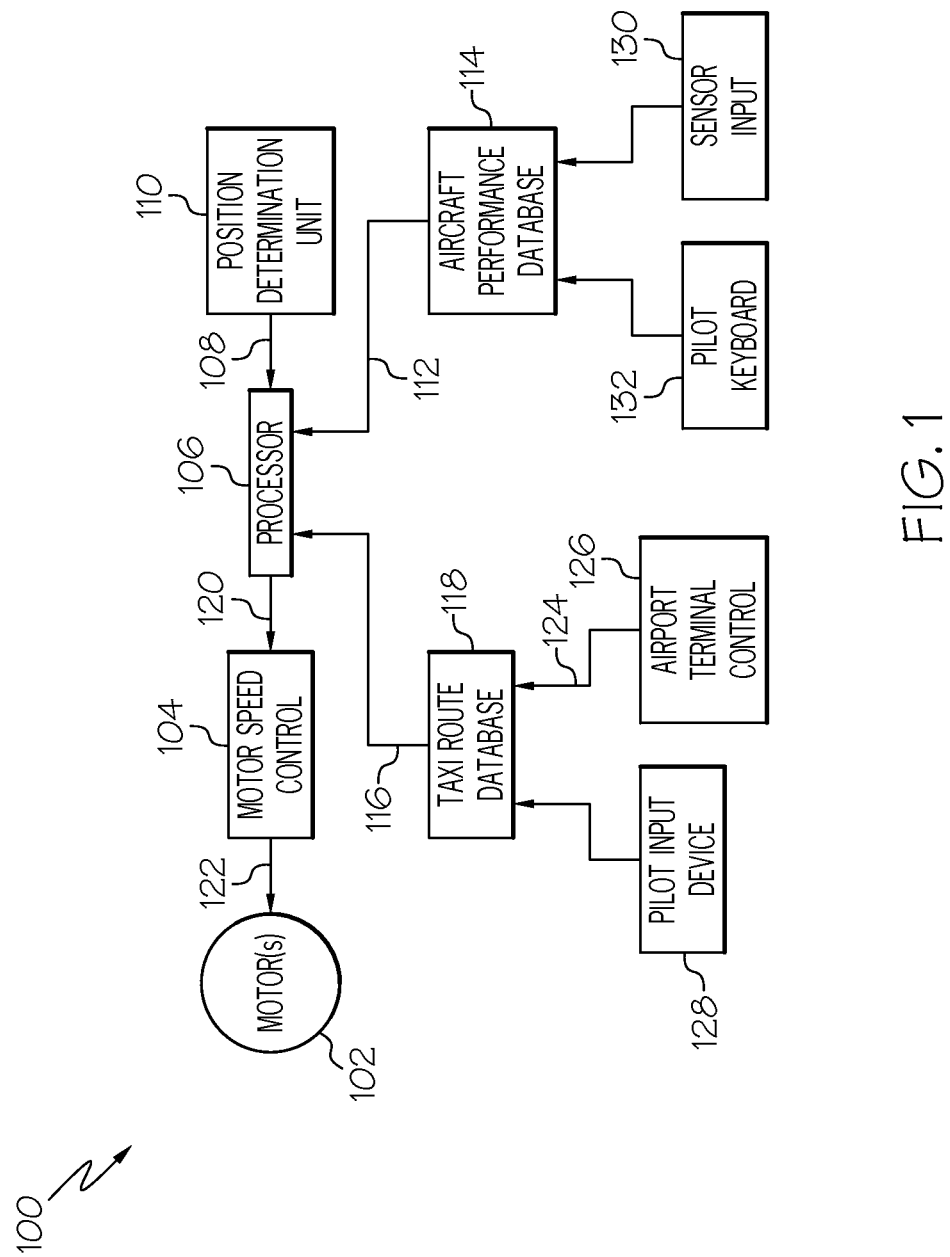
FIG. 1 is a block diagram of an automated taxi control system for an aircraft in accordance with an exemplary embodiment of the invention.

Referring now to FIG. 1, a schematic block diagram illustrates an exemplary embodiment of an automated taxi control system 100 for an aircraft (not shown) equipped with or retrofitted with an electric taxi system (ETS) (not shown). One or more electric motors 102 of the ETS may be provided with speed regulation through a motor controller 104 and a processor 106. The one or more motors 102 may be selectively coupled to drive landing gear wheels 176 (see FIG. 4) of the aircraft.

The processor 106 may be configured to receive an aircraft ground position signal 108 from a position determination unit 110. Additionally, the processor 106 may receive an aircraft performance signal 112 from an aircraft performance database 114 and a taxi route signal 116 from a taxi route database 118. The processor may be configured to continuously integrate the aircraft ground position signal 108, the aircraft performance signal 112 and the taxi route signal 116 and to provide a desired-speed signal 120 to the motor controller 104. The motor controller 104 may produce controlled power 122 to the one or more motors 102 so that the motors 102 may operate at a speed that corresponds to the desired-speed signal 120.

During taxing movement of the aircraft, the position determination unit 110 may continuously obtain ground-position data from one or more conventional sources, e.g., GPS data. The position determination unit 110 may be configured to include an interactive map of the airport in which the aircraft may be operating.

The taxi route database 118 may be configured with routing instructions 124 transmitted from an airport terminal control center (ATC) 126. The taxi route database 118 may include, among other things, information such as gate assignments, taxiways to be used to reach assigned gate, maximum permitted speeds at various ground locations. The taxi route database 118 may be re-configured each time that the aircraft arrives at a particular airport. In an exemplary embodiment, the taxi route database 118 may be adjusted or further reconfigured by a pilot of the aircraft through use of an input device 128 such as a keyboard, touch screen or cursor device.

The aircraft performance database 114 may be configured to include data such as available electrical power from auxiliary power unit (APU), weight of aircraft and maximum acceleration rates based on power availability and weight. Some relevant data may be provided to the aircraft performance database form various sensors 130, for example sensor that may indicate remaining fuel in tanks. Some data may be pre-loaded into the database 114 and other data may be provided through a pilot input device 132. For example, a pilot may enter a number of passengers and a weight of cargo and fuel into the database after an aircraft is loaded.

Figure 2:
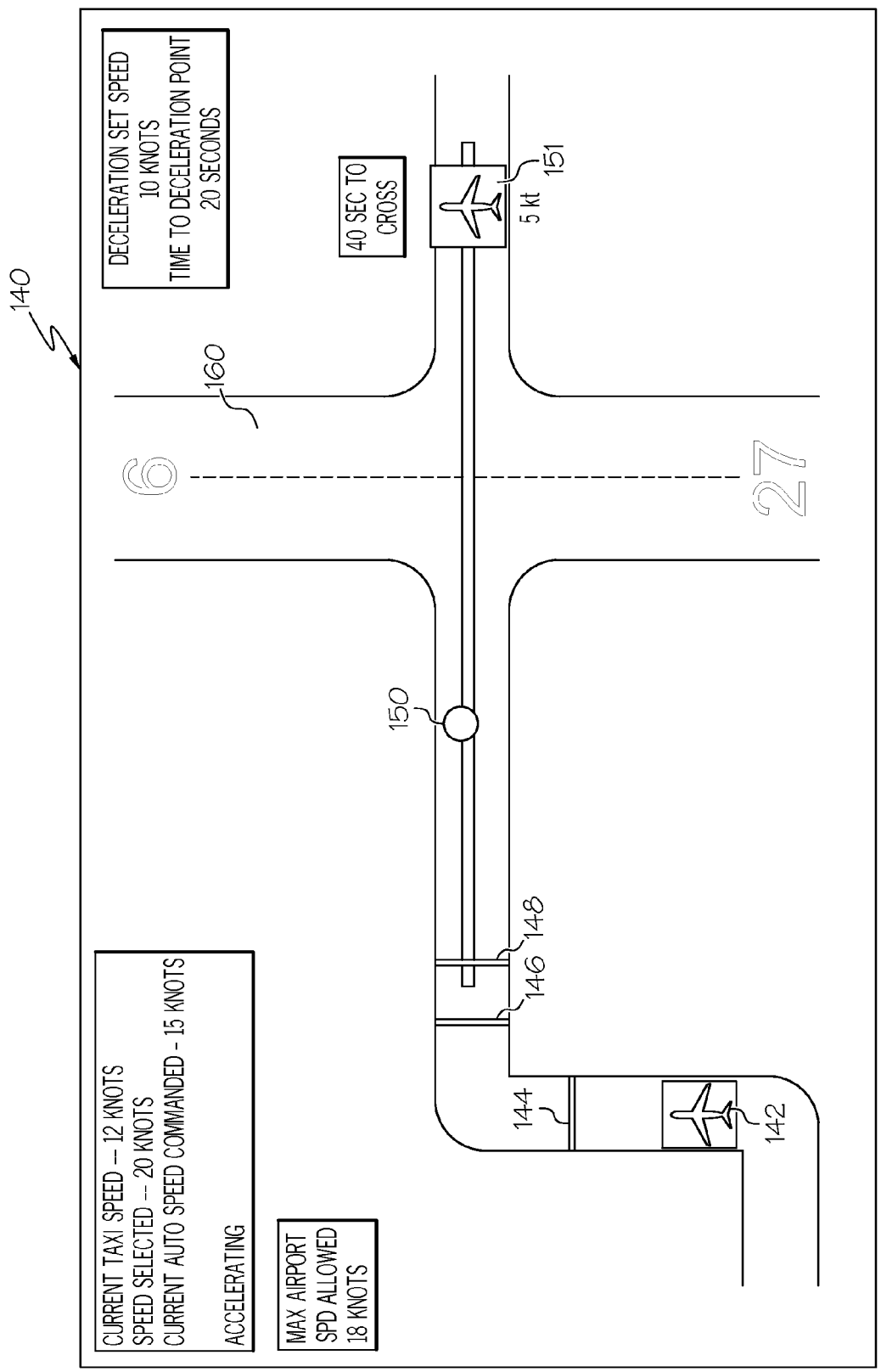
FIG. 2 is an illustration of a display unit of the system of FIG. 1 in accordance with an exemplary embodiment of the invention.

Referring now to FIG. 2 as well as FIG. 1, an exemplary embodiment of a display unit or screen 140 is illustrated. The screen 140 may be positioned in a flight deck of the subject aircraft, visible to the pilot, and may be continuously updated as the subject aircraft engages in ground movement under control of the automated taxi control system 100. The screen 140 may continuously provide the pilot with information relating to relative position of the subject aircraft on the ground and also predictive information relating to expected future behavior of the subject aircraft in response to being controlled by the automated taxi control system 100. For example, real-time aircraft position 142 may be shown. An indicator line 144 may show how far the subject aircraft may travel forward from the position 142 if the pilot were to disengage the ETS or manually set a desired speed to zero. Another indicator line 144 may show how far the subject aircraft may travel from the position 142 at the current speed and setting after a predetermined lapse of time (e.g., 20 seconds). An indicator line 146 may show how far the subject aircraft may travel from the position 142 at a maximum speed setting after a predetermined lapse of time (e.g., 20 seconds).

A deceleration-point symbol 150 may show a location at which the aircraft may begin decelerating in order to bring its speed to a desired limit so that a particular maneuver may be carried out safely. For example, the subject aircraft may be required to stop or hold before crossing a runway 160. In that case the subject aircraft must come to a complete stop before reaching the runway 160 because another aircraft, shown by a symbol 151 may be landing. Alternatively, the taxi route database 118 may dictate that the aircraft should turn onto the runway 160. In that case, the aircraft may be required to decelerate to a reduced speed, but not a complete stop, prior to making the turn. In these cases, the processor 106 may produce a reduced desired-speed signals 120 (i.e., a deceleration signal) to the motor controller 104

Figure 3:
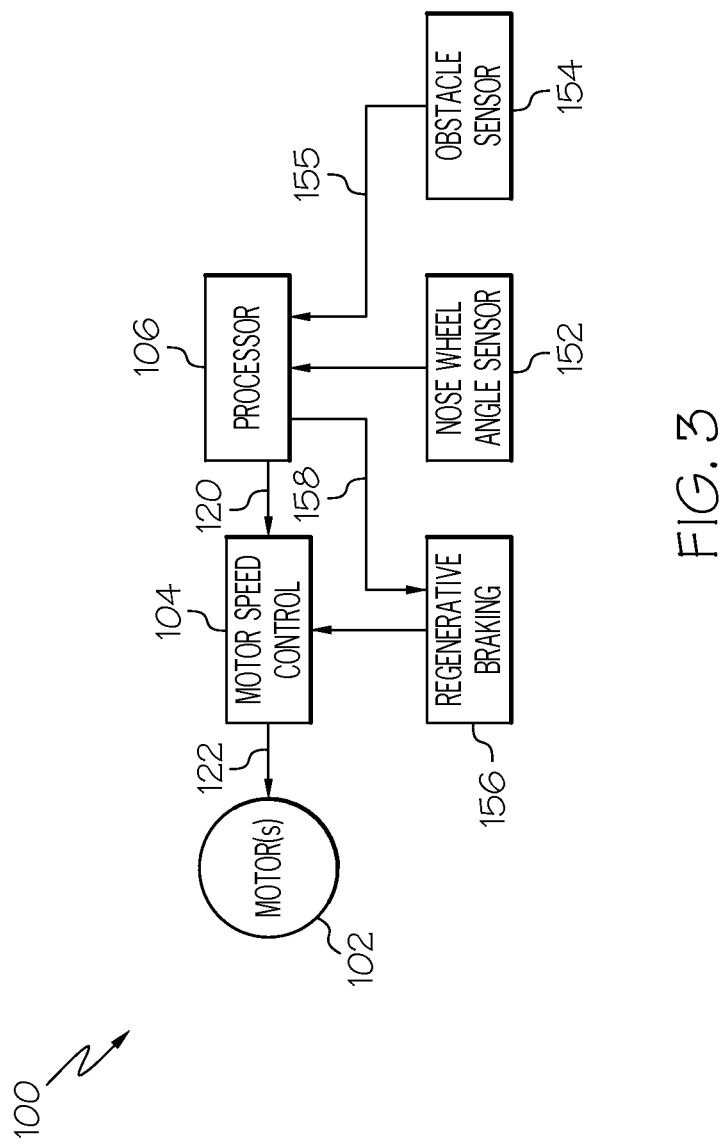
FIG. 3 is a block diagram of a portion of the system of FIG. 1 in accordance with an exemplary embodiment of the invention.

Referring now to FIG. 3, there are shown some additional features of the automated taxi control system 100 that, for purposes of simplicity, were not shown in FIG. 1. In the exemplary embodiment of FIG. 3, the system 100 may include a nose-wheel angle sensor 152, an obstacle sensor 154 and a regenerative braking command unit 156.

The processor 106 may be configured to produce a regenerative braking command 158, on an as needed basis, so that the aircraft may arrive at a turning location traveling at the desired turning speed. Additionally, the processor 106 may be configured to produce a reduced desired-speed signal 120 (i.e., a motor deceleration signal) to the motor controller 104 if the speed of the aircraft, during a turn, exceeds a safe speed for a sensed nose wheel angle. The processor 106 may also produce the regenerative braking command 158 on an as needed basis so that, during a turn, the aircraft does not exceed a safe speed for a sensed nose wheel angle.

The automated taxi control system 100 may employ the obstacle sensor 154 to control a speed of the aircraft so that a predetermined distance is maintained between the subject aircraft and an obstacle such as another aircraft that may be in front of the subject aircraft. In that context the processor 106 may receive an obstacle-present signal 155 from the obstacle sensor 154 and produce a reduced desired-speed signal 120 prior to reaching the predetermined minimum separation distance.

Figure 4:
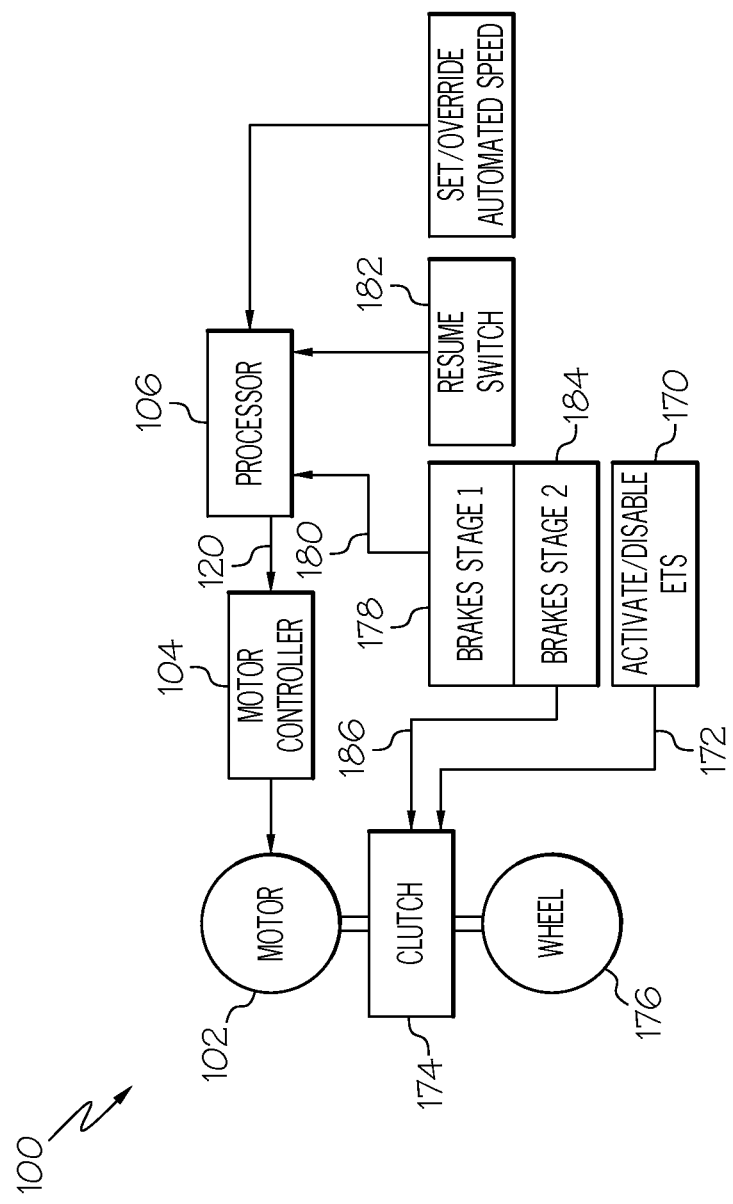
FIG. 4 is a block diagram of pilot-interface features of the system of FIG. 1 in accordance with an exemplary embodiment of the invention.

Referring now to FIG. 4, a block diagram illustrates some pilot operated control features of the automated taxi control system 100 of FIG. 1. A switch 170 may be actuated by the pilot to engage or disengage the ETS. Upon operation by the pilot, an ETS engagement or disengagement signal 172 may be transmitted to clutch 174 so that the clutch 174 may couple or uncouple the motor 102 from a landing gear wheel 176.

Two brake switches may also be provided for actuation by the pilot. A first-stage brake switch 178 may be actuated when a pilot lightly presses, or presses briefly, on one or more brake pedals (not shown) to coast or to prepare to operate friction brakes (not shown) of the aircraft. Such light pressure actuation may provide an automation-suspension signal 180 to the processor 106. In that case, the processor 106 may produce a signal 120 with a zero-speed value to the motor controller 104. In that context, the clutch 174 may continue maintaining a coupling between the motor 102 and the landing gear wheel 176. In the event that the pilot elects to return the aircraft to automated speed control, he or she may actuate a resume switch 182.

A second-stage brake switch 184 may be actuated when a pilot presses heavily on the brake pedal to operate the friction brakes. Such heavy pressure actuation may result in an ETS disengagement signal 186 being transmitted to the clutch 174. In that case, the clutch 174 may uncouple the motor 102 from the landing gear wheel 176.

Figure 5:
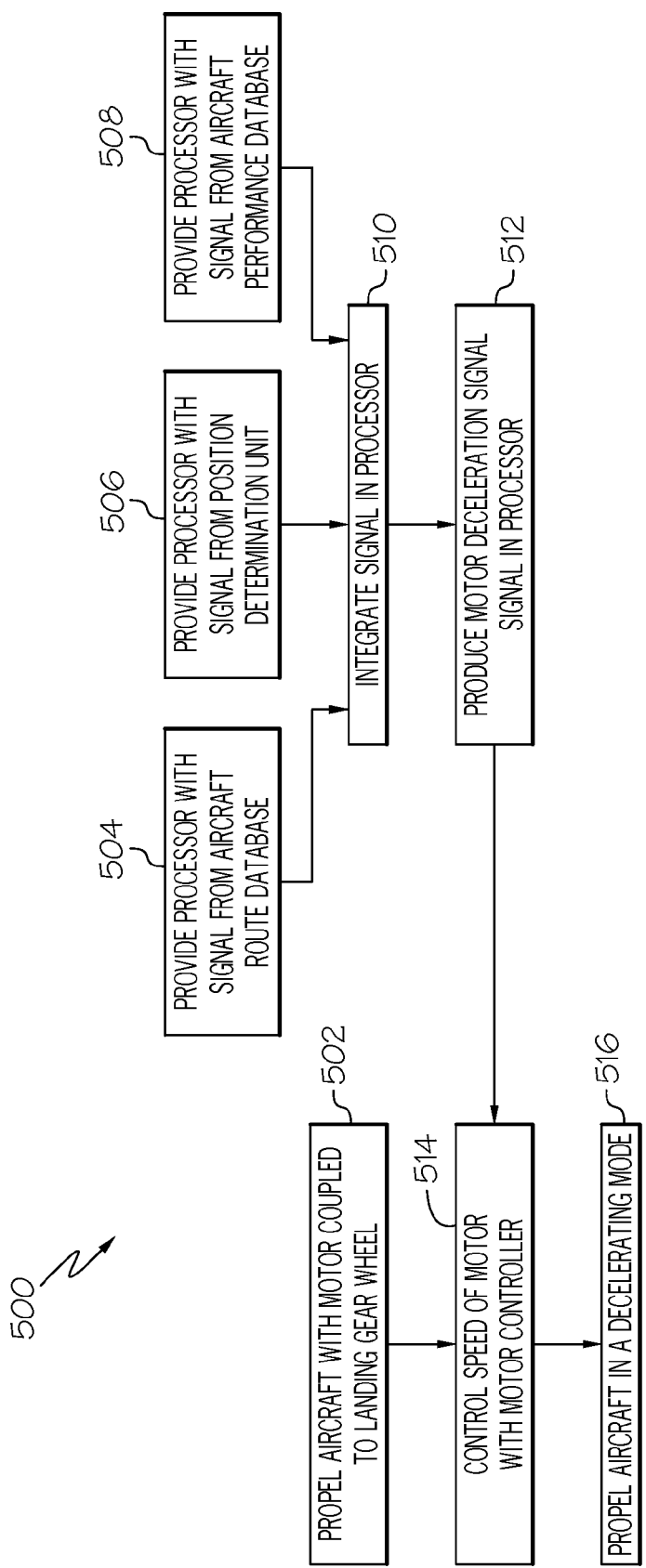
FIG. 5 is a flow chart of a method for controlling speed and providing automated guidance of an aircraft during ground operation in accordance with an exemplary embodiment of the invention.

Referring now to FIG. 5, a flow chart illustrates an exemplary embodiment of a method 500 for guiding and controlling speed of an aircraft during ground based operation. In a step 502 the aircraft may be propelled with a motor coupled to a landing gear wheel (e.g., the motor 102 may drive a clutch 174 that couples the landing gear wheel 176 to the motor 102). In a step 514 speed of the motor may be controlled by a motor controller (e.g., the motor controller 104 may control speed of the motor 102). In a step 504, a processor may be provided with a signal from an aircraft taxi route database, (e.g., the processor 106 may be provided with the signal 116 from the database 118). In a step 506, a processor may be provided with a signal from an aircraft position determination unit (e.g., the processor 106 may be provided with the signal 112 from the database 114). In a step 508, a processor may be provided with a signal from an aircraft performance database (e.g., the processor 106 may be provided with the signal 108 from the unit 110).

In a step 510, a processor may integrate signals from the aircraft taxi route database, the aircraft position determination unit and aircraft performance database (e.g., the processor 106 may integrate the signals 108, 112 and 116). In a step 512, a processor may produce a motor deceleration signal when the aircraft arrives at a predetermined distance from a predetermined location so that the aircraft arrives at the location traveling at a desired speed (e.g., the processor 106 may produce the signal 120 in a deceleration mode when the aircraft arrives at the point 150). In the step 514, the motor controller may control the speed of the motor at a reduced speed that corresponds to the signal produced in step 512. In a step 516, the aircraft may be propelled in a deceleration mode until reaching the speed that corresponds to the signal produced in step 512. Likewise the system may produce acceleration control speeds such as when completing the deceleration into a turn.

It should be understood, of course, that the foregoing relates to exemplary embodiments of the invention and that modifications may be made without departing from the spirit and scope of the invention as set forth in the following claims.

We claim:

1. An aircraft taxi control system comprising:
   at least one motor connected to drive at least one landing gear wheel of the aircraft;
   a motor controller connected to control speed of the at least one motor;
   an aircraft taxi route database;
   an aircraft position determination unit;
   an aircraft performance database;
   a processor configured to,
   a) integrate signals from the aircraft taxi route database, the aircraft position determination unit and aircraft performance database, and
   b) produce a motor deceleration signal, based on the signals integrated in step (a), to the motor controller when the aircraft arrives at a predetermined distance from a predetermined location so that the aircraft arrives at the predetermined location traveling at a desired speed without a need for manual speed adjustment by a pilot of the aircraft.

2. The taxi control system of claim 1 wherein the predetermined location is a turning location.

3. The taxi control system of claim 1 wherein the predetermined location is a hold location.

4. The taxi control system of claim 1 further comprising a regenerative braking system wherein the processor is configured to produce a regenerative braking command in addition to the motor deceleration signal on an as needed basis so that the aircraft arrives at the predetermined location traveling at the desired speed.

5. The taxi control system of claim 1 further comprising:
   a nose wheel angle sensor; and
   wherein the processor is configured to,
   a) integrate signals from the aircraft taxi route database, the aircraft position determination unit, aircraft performance database, and the nose wheel angle sensor, and
   b) produce a motor deceleration signal to the motor controller if the speed of the aircraft, during a turn, exceeds a safe speed for a sensed nose wheel angle.

6. The taxi control system of claim 5 wherein the processor is configured to produce a regenerative braking command in addition to the motor deceleration signal on an as needed basis so that, during a turn, the aircraft does not exceed a safe speed for the sensed nose wheel angle.

7. The taxi control system of claim 1 further comprising:
   an obstacle sensor; and
   wherein the processor is configured to,
   a) integrate signals from the aircraft taxi route database, the aircraft position determination unit, aircraft performance database, and the obstacle sensor, and
   b) produce a motor deceleration signal to the motor controller so that the aircraft maintains a desired separation from the obstacle.

8. The taxi control system of claim 7 wherein the processor is configured to produce a regenerative braking command in addition to the motor deceleration signal on an as needed basis so that the aircraft maintains the desired separation from the obstacle.

9. Apparatus for retrofitting an automated taxi control system onto an aircraft with a pre-existing friction brake system, the apparatus comprising:
   at least one motor connected to drive at least one landing gear wheel of the aircraft;
   a motor controller connected to control speed of the at least one motor and the aircraft without employment of a pre-existing friction braking system;
   an aircraft taxi route database;
   an aircraft position determination unit;
   an aircraft performance database;
   a processor configured to,
   a) integrate signals from the aircraft taxi route database, the aircraft position determination unit and aircraft performance database, and
   b) produce a motor deceleration signal and a regenerative braking command to the motor controller when the aircraft arrives at a predetermined distance from a predetermined location so that the aircraft arrives at the predetermined location traveling at a desired speed without use of the pre-existing friction brake system, wherein the motor deceleration signal and the regenerative braking command are based on the signals integrated in step (a).

10. The apparatus of claim 9 wherein the predetermined location is a turning location.

11. The apparatus of claim 9 wherein the predetermined location is a hold location.

12. The apparatus of claim 9 further comprising a disengagement switch operable by a pilot actuation of the pre-existing friction brake system to suspend operation of the automated taxi control system.

13. The apparatus of claim 9 further comprising a re-engagement switch operable by the pilot to resume operation of the automated taxi control system.

14. The apparatus of claim 9 further comprising a nose wheel angle sensor, wherein the processor is configured to,
- a) integrate signals from the aircraft taxi route database, the aircraft position determination unit, aircraft performance database, and the nose wheel angle sensor, and
- b) produce a motor deceleration signal to the motor controller if the speed of the aircraft, during a turn, exceeds a safe speed for a sensed nose wheel angle.

15. The taxi control system of claim 14 wherein the processor is configured to produce a regenerative braking command in addition to the motor deceleration signal on an as needed basis so that, during a turn, the aircraft does not exceed a safe speed for the sensed nose wheel angle.

16. A method for controlling an aircraft during ground based operation comprising the steps:

propelling the aircraft with at least one motor connected to drive at least one landing gear wheel of the aircraft;

controlling speed of the motor with a motor controller;

providing information to a processor from;

a) an aircraft taxi route database;

b) an aircraft position determination unit; and c) an aircraft performance database;

integrating signals in the processor from the aircraft taxi route database, the aircraft position determination unit and aircraft performance database, and producing a motor deceleration signal from the processor, based on the signals integrated in the processor, to the motor controller when the aircraft arrives at a predetermined distance from a turning location so that the aircraft arrives at the turning location traveling at a desired turning speed, wherein the motor deceleration signal is produced without manual speed adjusting of the aircraft by the pilot.

17. The method of claim 16 further comprising the step of producing a regenerative braking command in addition to the motor deceleration signal on an as needed basis so that the aircraft arrives at the turning location traveling at the desired turning speed.

18. The method of claim 16 further comprising:

integrating signals from a nose wheel angle sensor with signals from the aircraft taxi route database, the aircraft position determination unit, and the aircraft performance database; and producing a motor deceleration signal to the motor controller if the speed of the aircraft, during a turn, exceeds a safe speed for a sensed nose wheel angle.

19. The method of claim 16 further comprising the steps:

producing an obstacle-present signal;

sending the obstacle-present signal to the processor;

integrating, in the processor, the obstacle-present signal with the aircraft taxi route database, the aircraft position determination unit and the aircraft performance database, and providing a motor deceleration signal to the motor controller so that the aircraft maintains a desired separation from the obstacle.

\* \* \* \* \*